(12) United States Patent
Hedtke

(10) Patent No.: US 7,472,608 B2
(45) Date of Patent: Jan. 6, 2009

(54) FLANGELESS DIFFERENTIAL PRESSURE TRANSMITTER FOR INDUSTRIAL PROCESS CONTROL SYSTEMS

(75) Inventor: Robert C. Hedtke, Young America, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 11/732,570

(22) Filed: Apr. 4, 2007

(65) Prior Publication Data

US 2008/0245158 A1   Oct. 9, 2008

(51) Int. Cl.
*G01F 1/44*    (2006.01)

(52) U.S. Cl. .................. 73/861.63; 73/715; 73/716; 73/756

(58) Field of Classification Search .......... 73/700–756; 361/283.1–283.4
See application file for complete search history.

(56) References Cited

U.S. PATENT DOCUMENTS

| | | | |
|---|---|---|---|
| 3,521,487 A | 7/1970 | Akeley | |
| 3,822,592 A | 7/1974 | Siegel et al. | |
| 4,237,739 A | 12/1980 | Owen et al. | |
| 4,466,290 A | 8/1984 | Frick | |
| 4,672,728 A | 6/1987 | Nimberger | |
| 4,745,810 A * | 5/1988 | Pierce et al. | 73/706 |
| 4,974,308 A | 12/1990 | Nimberger | |
| 5,022,271 A | 6/1991 | Hannon, Jr. | |
| 5,469,749 A | 11/1995 | Shimada et al. | |
| 5,672,832 A | 9/1997 | Cucci et al. | |
| 5,725,024 A | 3/1998 | Nimberger | |
| 6,059,254 A | 5/2000 | Sundet et al. | |
| 6,349,735 B2 | 2/2002 | Gul | |
| 6,543,297 B1 | 4/2003 | Kleven | |
| 6,568,278 B2 | 5/2003 | Nelson et al. | |
| 6,640,650 B2 * | 11/2003 | Matsuzawa et al. | 73/861.47 |
| 6,672,173 B2 | 1/2004 | Bell | |
| 6,725,731 B2 | 4/2004 | Wiklund et al. | |
| 6,772,641 B2 | 8/2004 | Massimo et al. | |
| 6,901,803 B2 | 6/2005 | Fandrey | |
| 6,918,303 B2 | 7/2005 | Casimiro et al. | |
| 6,920,795 B2 | 7/2005 | Bischoff et al. | |
| 2005/0172738 A1 | 8/2005 | Broden | |

* cited by examiner

*Primary Examiner*—Andre J Allen
*Assistant Examiner*—Jermaine Jenkins
(74) *Attorney, Agent, or Firm*—Kinney & Lange, P.A.

(57) ABSTRACT

An industrial pressure transmitter, for use in industrial process control systems, comprises a differential pressure sensor and an integrated process connector connected to the differential pressure sensor. A process fluid flow duct extends through the process connector and receives an industrial process fluid. A primary element is positioned in the process fluid flow duct for producing a pressure differential in the process fluid across the primary element. The differential pressure sensor is connected to the process fluid flow duct to sense the pressure differential across the primary element.

30 Claims, 5 Drawing Sheets

FLANGELESS DIFFERENTIAL PRESSURE TRANSMITTER FOR INDUSTRIAL PROCESS CONTROL SYSTEMS

BACKGROUND OF THE INVENTION

This invention relates generally to process instruments used in industrial process control systems. More particularly, the present invention relates to a flangeless differential pressure transmitter having an integrated primary element.

Industrial process transmitters are used to monitor process variables of industrial process fluids. For example, pressure transmitters are commonly used in the process control industry for sensing pressures or flow rates of chemicals or petroleum products. A pressure transmitter includes a sensor or transducer that produces an electrical output in response to changes in a process pressure. For example, a capacitive pressure transducer produces a varying electrical signal based on the pressure of a process fluid changing the capacitance of the transducer. The electrical signal of the sensor is processed by transmitter circuitry to produce an electrical output that can be monitored as an indication of the pressure of the process fluid. Pressure transmitters also include electronics and circuitry that allow them to communicate with a process control system for either remotely monitoring the electrical output through a control loop or network, or locally such as with an LCD screen.

A typical capacitive-based pressure transmitter is connected to the process fluid through a simple hydraulic system. The hydraulic system comprises one or more hydraulic passageways that are filled with precise amounts of fill fluid, which communicate the process fluid pressure to the capacitive transducer. At a first end of a hydraulic passageway is a sensor diaphragm that serves as a variable capacitor plate for the pressure sensor. At a second end of the hydraulic passageway is a transmitter isolation diaphragm that separates the fill fluid from the process fluid. In pressure transmitters, the transmitter isolation diaphragms can be positioned such that they are co-planar along a mating face on the base of the transmitter. Thus, the transmitter base allows transmitter isolation diaphragms to be extended to an outer surface of the transmitter suitable for mating with a process fluid source. However, since the transmitter isolation diaphragms are typically flush with the mating face of the transmitter base, a flange adapter union or process flange is typically required to join the process fluid source with the transmitter isolation diaphragms in a sealed arrangement. A process flange is a coupling device that provides a means for mechanically securing the transmitter base with a process fluid source. For example, COPLANAR™ process flanges are commercially available from the assignee of the present invention. A typical process flange comprises through-bores for bolted attachment to through-bores of the transmitter base, and threaded through-bores that align with the transmitter isolation diaphragms for joining with process fluid piping. Thus, the process fluid is brought into contact with the transmitter isolation diaphragms through a bolted connection. As the process fluid pressure fluctuates, the process fluid exerts a corresponding force on the isolation diaphragm at the first end of the hydraulic system, which through the fill fluid adjusts the position of a sensor diaphragm of the capacitive pressure sensor at a second end of the hydraulic system. Furthermore, in order to obtain flow measurements from the transmitter it is also necessary to include a primary flow element, such as a venturi tube, orifice plate, pitot tube or flow nozzle, in the process pipe. Thus, connecting a process fluid source to a pressure transmitter often requires multiple additional components, which provide potential leak points and add costs to installing process control systems. Therefore, there is a need for a simplified and less expensive pressure transmitter with a reduced number of potential leak paths.

BRIEF SUMMARY OF THE INVENTION

The present invention is directed toward an industrial pressure transmitter for use in industrial process control systems. The industrial pressure transmitter comprises a differential pressure sensor and an integrated process connector connected to the differential pressure sensor. A process fluid flow duct extends through the process connector and receives an industrial process fluid. A primary element is positioned in the process fluid flow duct for producing a pressure differential in the process fluid across the primary element. The differential pressure sensor is connected to the process fluid flow duct to sense the pressure differential across the primary element.

DETAILED DESCRIPTION

Figure 1:
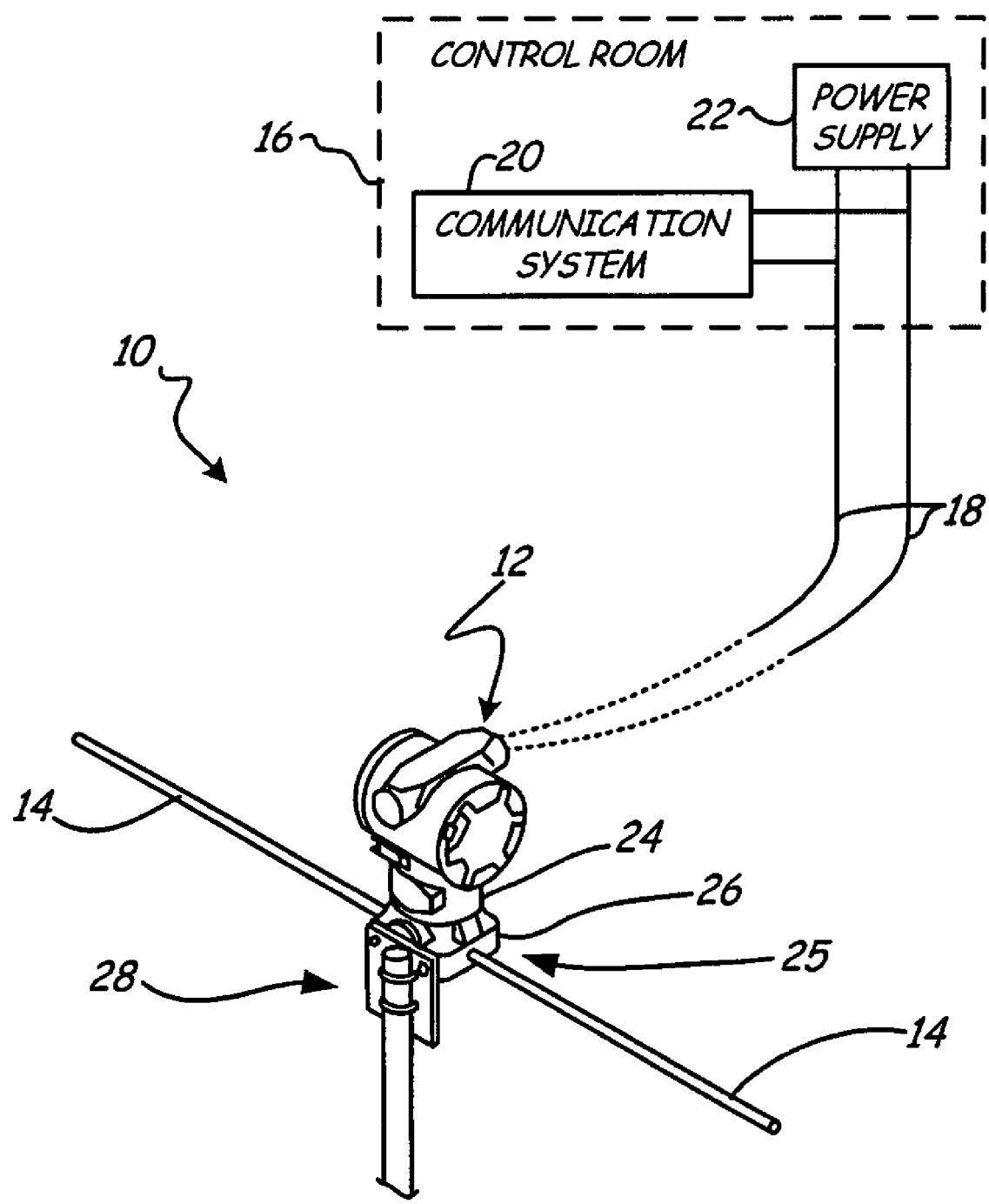
FIG. 1 shows a process control system including a flangeless pressure transmitter of the present invention.

FIG. 1 shows industrial process control system 10 in which industrial pressure transmitter 12 of the present invention is used. Process control system 10 includes flangeless pressure transmitter 12, pipe 14, control room 16 and control loop 18. Control room 16 includes communication system 20 and power supply 22. In one embodiment, pressure transmitter 12 is a two-wire transmitter for operating on a 4-20 mA loop. In such an embodiment, control loop 18 includes a pair of wires for supplying power to process transmitter 12 from power supply 22. Control loop 18 also enables control room 16 to transmit data to and receive data from pressure transmitter 12 utilizing communication system 20. Typically, a 4 mA DC current provides sufficient energy for operating the sensor and transmitter circuitry of process transmitter 12 and any local display. In other embodiments, process transmitter 12 communicates with control room 16 over a digital bus, over a wireless network or through a handheld device.

Pressure transmitter 12 includes a pressure sensor and transmitter circuitry for generating an electrical signal based on a sensed pressure of an industrial process fluid. Pressure transmitter 12 also includes other electrical and electronic components for transmitting the electrical signal over control loop 18 to control room 16 or a local display such as an LCD screen, or both, and for processing the sensor output. Pressure transmitter 12 also comprises transmitter housing 24 and sensor module 25 such that it is directly coupled with pipe 14, in which a process fluid flows, to obtain differential pressure measurements.

Sensor module 25 includes integrated process connector 26 to which pipe 14 is directly connected through an integral process fluid flow duct. Process connector 26 includes a primary element, such as an orifice plate, positioned in the process fluid flow duct such that flow measurements of the process fluid in pipe 14 are readily obtained. Integrated process connector 26 also includes coupling features such that pressure transmitter 12 is directly connectable to both a process fluid source, such as pipe 14, and mounting components, such as bracket 28. Thus, pressure transmitter 12 is flangeless such that the use of additional process flanges, manifolds, pipe extensions or primary elements is not required.

Figure 2:
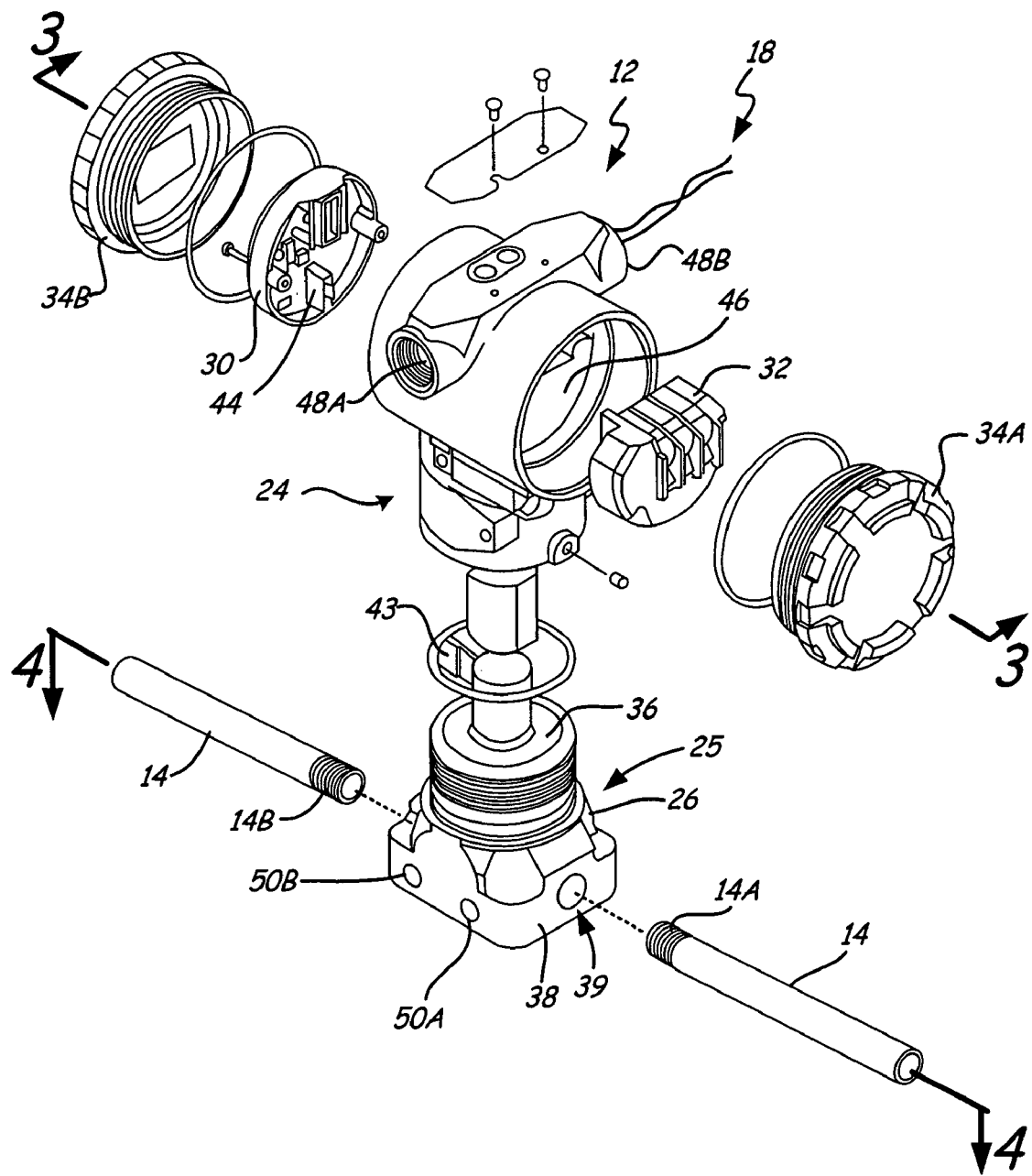
FIG. 2 shows an exploded view of the flangeless pressure transmitter of FIG. 1 including a sensor module and a transmitter housing.

FIG. 2 shows an exploded view of one embodiment of pressure transmitter 12 of FIG. 1. Pressure transmitter 12, including housing 24 and sensor module 25, is configured for measuring flow of the process fluid of pipe 14. Pressure transmitter 12 also includes circuitry 30, terminal 32, cover 34A and cover 34B. Connector 26 includes sensor pocket 36 and base 38, to which pipe 14 is connected at process fluid flow duct 39. Fluid flow duct 39 can be manufactured in various diameters to interface with various sizes of process pipes. Pocket 36 includes the differential pressure sensor and electronic circuitry for producing a pressure signal from the sensor for transmission to transmitter circuitry 30 through cable 43 and plug 44. Circuitry 30 and terminal 32 are secured within housing 24 at hub 46, which provides an anchor point for securing components of transmitter 12 inside housing 24. Circuitry 30 generates an output based on the sensed process variable of the sensor within pocket 36, and transmits the output to control room 16 over control loop 18, a local display situated in transmitter circuitry 30, or both. Terminal 32 and circuitry 30 are sealed within access openings of housing 24 with covers 34A and 34B. Covers 34A and 34B provide a repeatable and resealable entry into transmitter housing 24 for accessing circuitry 30 and terminal 32. Covers 34A and 34B are typically threaded onto housing 24 by at least seven threaded engagements to prevent water or other contaminants from entering transmitter 12 and to provide a flame-quenching function. Additionally, control loop 18 is brought into housing 24 through conduit connections 48A and 48B. Conduit connections 48A and 48B are sealed around control loop 18 with, for example, a plug in order to isolate circuitry 30 and terminal 32 within housing 24 at covers 34A and 34B. Base 38 includes mounting bores 50A and 50B for securing pressure transmitter 12 to mounting bracket 28, or some other such fixture. In other embodiments, transmitter 12 is supported within process control system 10 solely by the weight of pipe 14. Pressure transmitter 12 is spliced directly into pipe 14 such that threads 14A and 14B of pipe 14 are threaded directly into duct 39 of connector 26. Thus, additional mounting hardware or flanges are not needed to connect transmitter 12 with the process fluid pipe 14.

Figure 3:
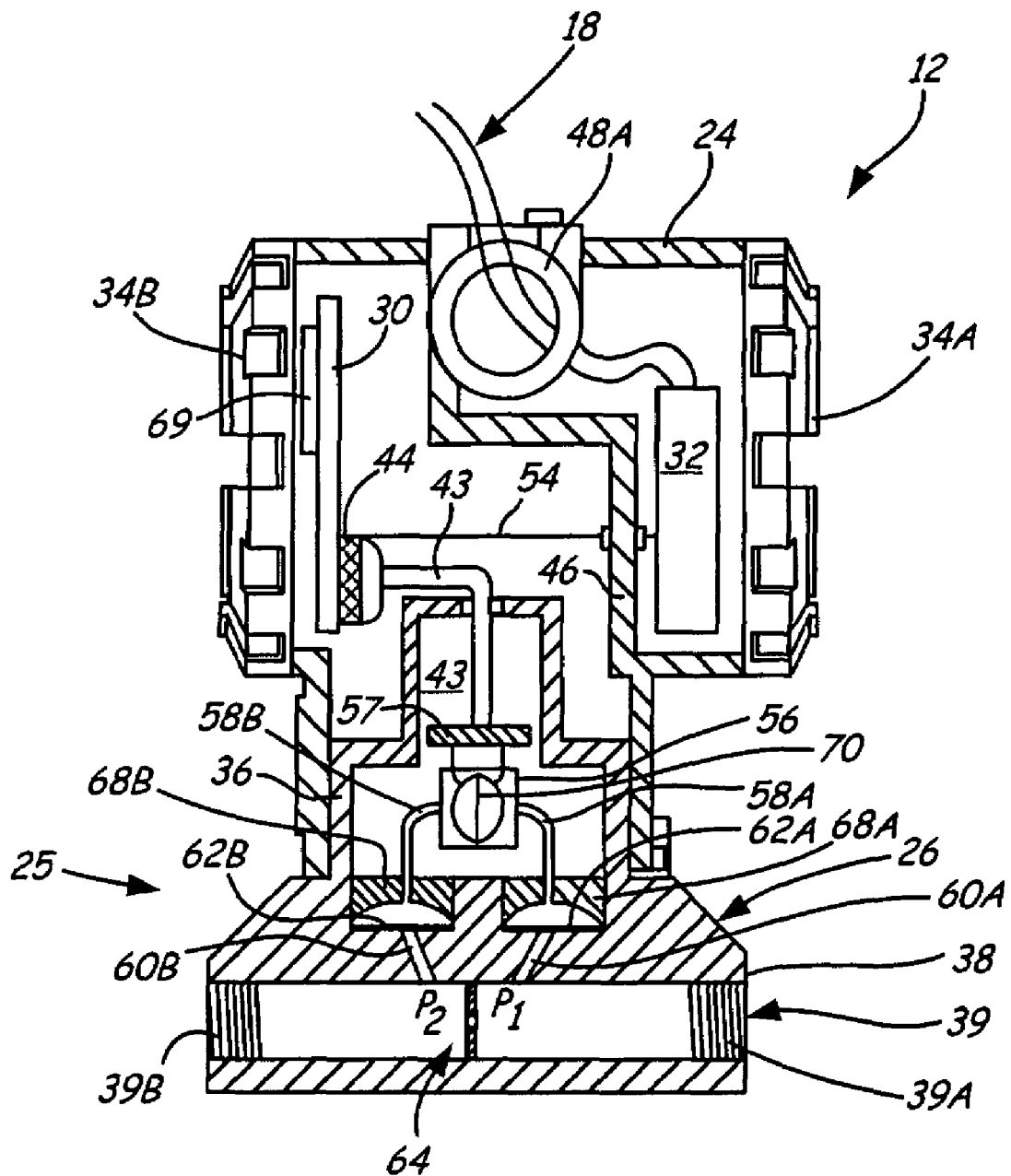
FIG. 3 is a cross-sectional side view of the pressure transmitter of FIG. 2 showing the sensor module having a capacitance-based differential pressure sensor.

FIG. 3 is schematic side view of pressure transmitter 12 as taken through section 3-3 of FIG. 2. Pressure transmitter 12 includes transmitter housing 24 and sensor module 25. Transmitter housing includes circuitry 30, terminal 32, cover 34A, cover 34B, cable 43, plug 44, conduit connection 48A and connectors 54. Sensor module 25 includes integrated process connector 26, which comprises sensor pocket 36 and base 38. It is appreciated that transmitter housing 24 and sensor module 25 may alternatively be formed together as an integral unit. Sensor pocket 36 houses sensor 56 and sensor electronics 57 while sensor base 38 includes process fluid duct 39 (including threaded couplings 39A and 39B), fill fluid passageways 58A and 58B, impulse piping lines 60A and 60B, isolation diaphragms 62A and 62B, primary element 64, and diaphragm bases 68A and 68B.

In this embodiment, circuitry 30 and terminal 32 are joined to housing 24 at hub 46. Terminal 32 receives process control loop 18 from control room 16 such that communication system 20 and power supply 22 are connected with transmitter 12. Terminal 32 is connected to circuitry 30 through connector 54, which is connected to sensor electronics 57 through cable 43. Sensor 56 produces an electrical output based on a sensed pressure differential in process fluid duct 39. The electrical output is relayed to sensor electronics 57 then to transmitter circuitry 30 through cable 43. Circuitry 30 processes the output signal of sensor 56, whereby the pressure of the pressurized fluid can be relayed to a local display, such as LCD screen 69 associated with circuitry 30, or to control room 16 over control loop 18. In one embodiment circuitry 30 produces a 4 to 20 mA signal. In another embodiment, circuitry 30 includes software, circuitry and other electronic components for interacting and communicating on a digital network using a digital protocol such as HART® or FOUNDATION™ Fieldbus. Alternatively, a wireless communication network could be used.

Threaded couplings 14A and 14B of process fluid pipe 14 are connected to base 38 at threaded couplings 39A and 39B. Base 38 can be custom manufactured with a variety of thread types for different industrial process connections. In various embodiments, threaded couplings 39A and 39B comprise ¼" national pipe thread (NPT) or ⅛" NPT male pipe thread (MPT). However, in other embodiments, couplings 39A and 39B can comprise other fluid couplings, such as quick disconnects, or poppet valve type connectors. The process fluid flows through duct 39, for example, from coupling 39A toward coupling 39B. Primary element 64 is positioned between couplings 39A and 39B in duct 39 such that a pressure differential is produced in the process fluid.

Primary element 64 comprises a flow restriction means for producing a pressure differential in the process fluid, while also permitting the process fluid to flow through duct 39. In the embodiment shown, primary element 64 comprises an orifice plate, however in other embodiments of the present invention, primary element 64 comprises a venturi tube, a pitot tube or a flow nozzle. As such, a pressure differential is produced across the primary element as the process fluid traverses primary element 64, with first pressure P1 on a first, high-pressure side of primary element 64 and second pressure P2 on a second, low-pressure side of primary element 64. The pressure differential is sensed by sensor 56.

Sensor 56 is, for example, a capacitance-based pressure cell, in which the capacitance of pressure sensor 56 changes as a function of position of diaphragm 70. The position of diaphragm 70 changes as pressures P1 and P2 of the process fluid changes, as presented through the fill fluid and passageways 58A and 58B. Sensor diaphragm 70 provides a flexible barrier between passageways 58A and 58B that deflects in response to a change in the pressure difference between channels 60A and 60B (e.g. the pressure difference across primary element 64, or P1-P2). Thus, the change in capacitance of sensor 56 can be used to determine various parameters of the process fluid, such as volumetric or mass flow rates, in duct 39 based on the pressure differential between P1 and P2. In other embodiments, sensor 56 operates on other known sensing principles, such as with piezoresistive strain gauge technology.

Pursuant to one embodiment, integrated process connector 26 is typically cast and machined such that base 38 and pocket 36 are a unitary piece. In various embodiments of the invention, base 38 and pocket 36 are comprised of alloys such as stainless steel, HASTELLLOY™ or MONEL™. Pocket 36 primarily comprises a hollowed-out cavity for receiving sensor 56 and fill fluid passageways 58A and 58B above base 38. In other embodiments, pocket 36 can be welded to base 38 and then provided with a cover. Pocket 36 and base 38 of integrated process connector 26 together provide a framework that permits sensor 56 to communicate with process fluid duct 39 and control room 16. Differential pressure sensor 56 is connected to control room 16 through circuitry 30 and 57, and control loop 18. Sensor 56 is presented with two different pressures from duct 39 from which to sense a differential pressure through a hydraulic system. The hydraulic system comprises fill fluid passageways 58A and 58B, impulse piping lines 60A and 60B, and isolation diaphragms 62A and 62B.

Base 38 is fabricated such that impulse piping lines 60A and 60B and duct 39 are integrally included to provide a leak proof connection with impulse piping lines 60A and 60B. Impulse piping lines 60A and 60B typically comprise narrow channels machined into base 38 between duct 39 and diaphragm bases 68A and 68B. In one embodiment, electrical discharge machining (EDM) is used to produce impulse piping lines 60A and 60B. Likewise, duct 39 is machined directly out of base 38. Impulse piping line 60A extends from duct 39 on the first side of primary element 64 such line 60A fills with the process fluid of pipe 14. As such, pressure P1 is transmitted to isolation diaphragm 62A by the process fluid. Similarly, impulse piping line 60B extends from duct 39 on the second side of primary element 64 and is filled with the process fluid such that pressure P2 is transmitted to isolation diaphragm 62B by the process fluid. Diaphragms 62A and 62B seal impulse piping lines 60A and 60B to prevent process fluid from entering passageways 58A and 58B.

Fill fluid passageways 58A and 58B typically comprise segments of stainless steel tubing connected to impulse piping 60A and 60B through welded connections with diaphragm bases 68A and 68B. Diaphragm bases 68A and 68B comprise stainless steel disks welded to apertures within pocket 36 of base 38. Diaphragm bases 68A and 68B include drilled or machined holes to accept fill fluid passageways 58A and 58B, respectively, from the top side of bases 68A and 68B. Diaphragms 62A and 62B typically comprise flexible foil membranes that are welded, or otherwise secured, to the bottom sides of diaphragm bases 68A and 68B, respectively. Passageways 58A and 58B and the cavities formed between diaphragm bases 68A and 68B and diaphragms 62A and 62B, respectively, are filled with hydraulic fill fluid and are sealed at their first ends by flexible diaphragms 62A and 62B, and at their second ends by sensor 56. The hydraulic fill fluid is comprised of a pressure transmitting hydraulic fluid, which can be of any suitable hydraulic fluid that is known in the art. Such hydraulic fill fluids are typically inert, stable and substantially incompressible. Additionally, the hydraulic fluids have dielectric properties that make them suitable for serving within capacitance-based pressure sensors. In various embodiments, the first and second hydraulic fluids are comprised of DC 200®, DC 704® or Syltherm XLT® silicone oil as is commercially available from Dow Corning Corporation, Midland, Mich., USA. In other embodiments, similar fluids can be used such as Halocarbon® from Halocarbon Products Corporation, River Edge, N.J., USA. The fill fluid communicates the pressure of the process fluid from impulse piping lines 60A and 60B to sensor 56 within pocket 36. Diaphragm bases 68A and 68B provide durable weld points for securing diaphragms 62A and 62B to base 38.

In prior art transmitters such as is described in the background, the diaphragms are typically joined to a planar mating face on the bottom of a transmitter such that they can be readily joined with a process flange or the like. However, the weld points of the diaphragms can become stressed as they are mechanically strained when bolted to the process flange. With the present invention, diaphragms 62A and 62B are moved into the interior of base 38, away from any mechanical couplings. The recesses into which diaphragm bases 68A and 68B are seated extend into base 38 to a depth to reduce stress points around diaphragms 62A and 62B. The recesses also extend into base 38 such that diaphragm bases 68A and 68B are substantially co-planar with each other, although they need not be to be functional. The disks of bases 68A and 68B are shaped to match the shape of the recesses into which they are inserted such that diaphragms 62A and 62B are fully encapsulated between base 38 and the bottoms of bases 68A and 68B, and that the tops of bases 68A and 68B are flush with the top of base 38. In one embodiment, diaphragm bases 68A and 68B are about 0.125 inches (~0.3175 cm) to about 0.25 inches (~0.635 cm) thick. In one embodiment, the bottoms of diaphragm bases 68A and 68B are located half way between the top surface of base 38 and the top surface of duct 39. Diaphragm bases 68A and 68B are recessed within base 38 to provide a reduced-stress pocket for diaphragms 62A and 62B. Stress on diaphragms 62A and 62B is further reduced by the unitary construction of base 38. Thus, due to the configuration of sensor module 26, transmitter 12, including primary element 64 and pressure sensor 56, is directly connectable to process fluid pipe 14 through a reduced-stress connection, without the need for additional process flanges or manifolds.

Figure 4:
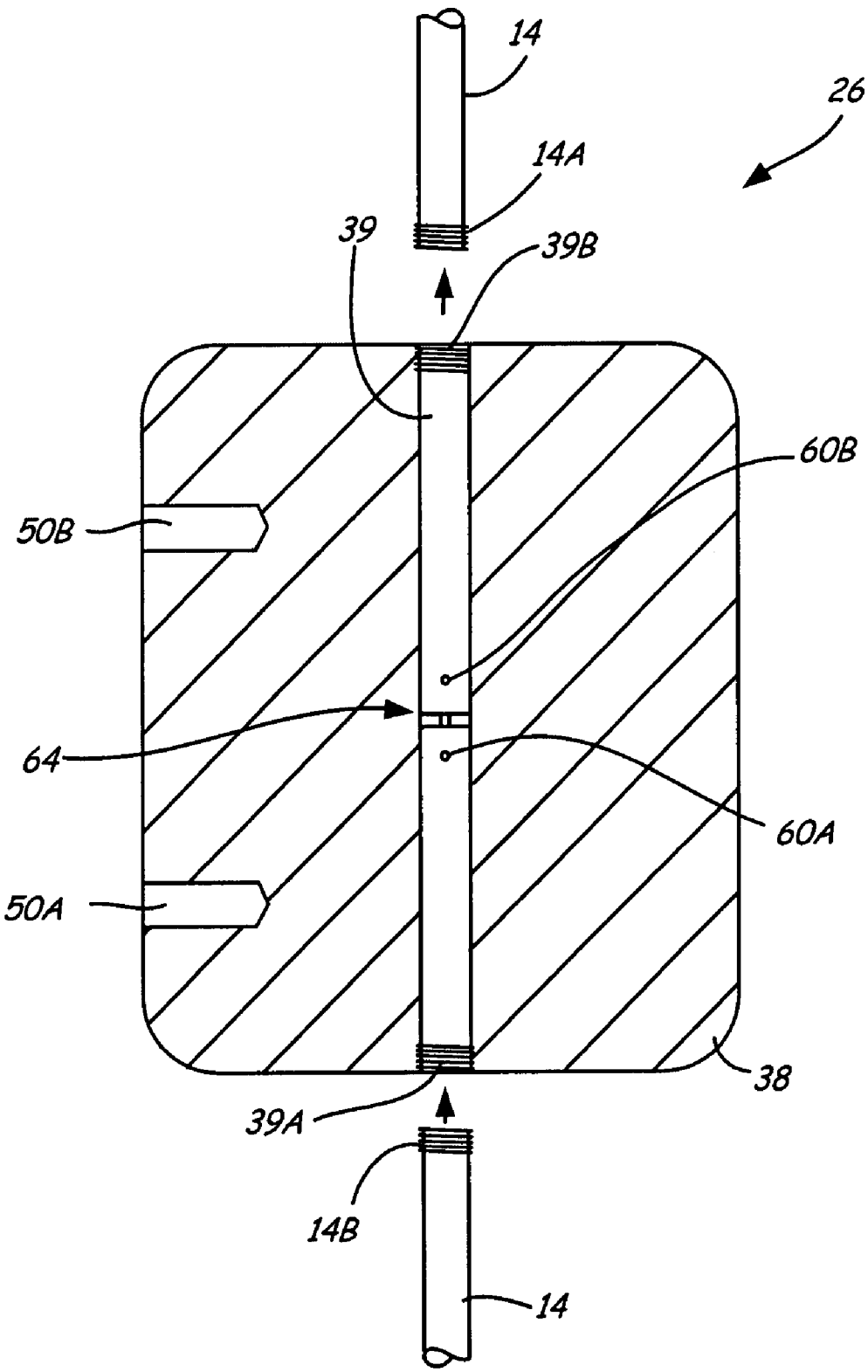
FIG. 4 shows a cross-sectional top view of the base portion of the sensor module of FIG. 2.

FIG. 4 shows a cross sectional view of one embodiment of base 38 of sensor module 26 as taken through section 4-4 of FIG. 2. Base 38 includes process fluid duct 39, mounting bore 50A, mounting bore 50B, primary element 64, and impulse piping lines 60A and 60B. Process pipe 14 is connected to duct 39 with threaded coupling 39A and 39B. Primary element 64 is generally positioned in the center of duct 39, between impulse piping lines 60A and 60B. In the embodiment shown, primary element 64 comprises an orifice plate, which is integrally cast and machined as a portion of base 38. Thus, primary element 64 is formed directly into and from duct 39. As described above, primary element 64 produces a pressure differential within the process fluid that is transmitted to sensor 56 through impulse piping lines 60A and 60B. Thus, process fluid continuously flows through base 38 and primary element 64 such that sensor 56 can derive a differential pressure signal.

Duct 39 is typically cast into base 38 such that sensor module comprises a compact, uni-body construction. Base 38 can be roughcast and then machined to the desired dimensions. For example, the sizes of duct 39 and threaded couplings 39A and 39B can be machined to the final dimensions after casting based on the industrial process control system it is to be used with. Also, primary element 64 can be cast into duct 39 with oversized dimensions and then machined down to produce an orifice plate or some other element having the desired flow restriction. In other embodiments, base 38 can be cast and machined such that primary element 64 does not include an opening and, as such, divides duct 39 into two separate halves or chambers closed off from each other. Thus, transmitter 12 can be used as a standard differential pressure transmitter or in conjunction with remote seal systems. The differential pressure connections can be connected to couplings 39A and 39B. In this configuration, duct 39 provides a leak-proof connection to base 38. Base 38 is therefore constructed without the need for brazed or welded joints.

The unitary construction of base 38 thus eliminates the need for joining transmitter 12 with external process control devices such as manifolds or process flanges. This reduces the cost of transmitter 12 as the need for a multitude of bolts and fasteners is eliminated. This enhances the stability, and hence reliability, of transmitter 12 as errors and leakage associated with typical threaded couplings are eliminated. For example, process transmitters are typically bolted to process flanges at their bottom surface where the isolation diaphragms are located. However, the bolted connections can contribute to transmitter instability in certain applications. For example, over large temperature changes and high range down conditions, the bolted connections may relax, which may alter the interface between the process flange and the isolations diaphragms of the transmitter, thus causing a change in the pressure measurement and producing error. The uni-body construction of integrated process connector 26 eliminates threaded connections between the process fluid source and the isolation diaphragms, thus eliminating potential sources of error due to bolted connections.

Base 38 of integrated process connector 26 permits transmitter 12 to be connected to a plurality of industrial process fluid pipes with only a single process fluid junction. For example, mounting bores 50A and 50B extend into base 38 such that pressure transmitter 12 can be mounted to bracket 28, or some other such fixture, with, for example, threaded fasteners. Process fluid duct 39 and process fluid couplings 39A and 39B permit transmitter 12 to be directly connected to a process fluid source, such as pipeline 14. Primary element 64 is placed inside duct 39 such that transmitter 12 is directly connected with a fluid flow metering device. Thus, a complete pressure sensing system can be quickly and simply integrated into an industrial process having to make only a single wet connection, i.e. a connection through which the process fluid flows. It is oftentimes, however, desirable to cease fluid flow through primary element 64 such that transmitter 12 can execute various functions, or maintenance can be performed on transmitter 12. Accordingly, base 38 can be connected with external bypass piping.

Figure 5A:
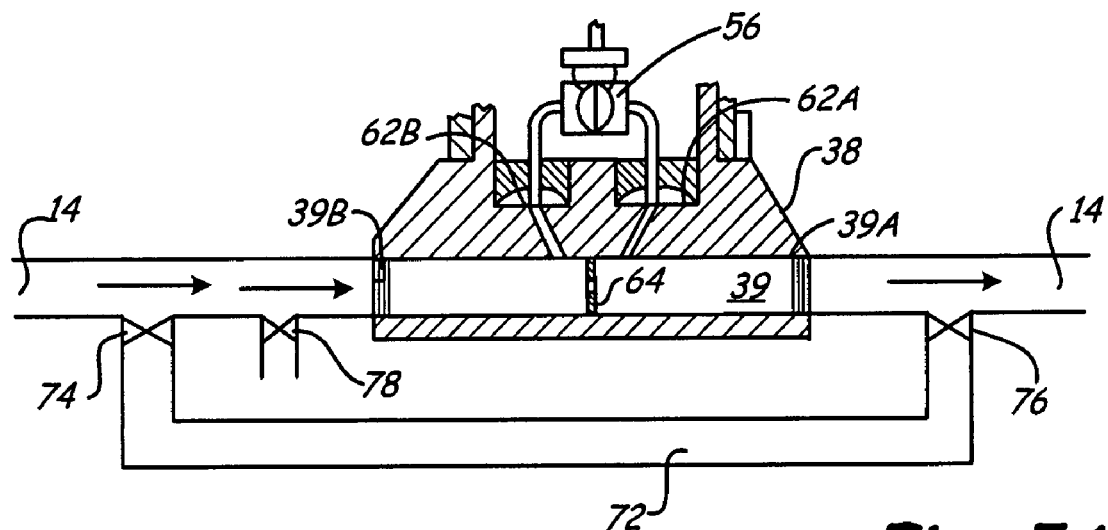
FIG. 5A shows the flangeless pressure transmitter of FIG. 3 with external valves and piping in an open configuration.
Figure 5B:
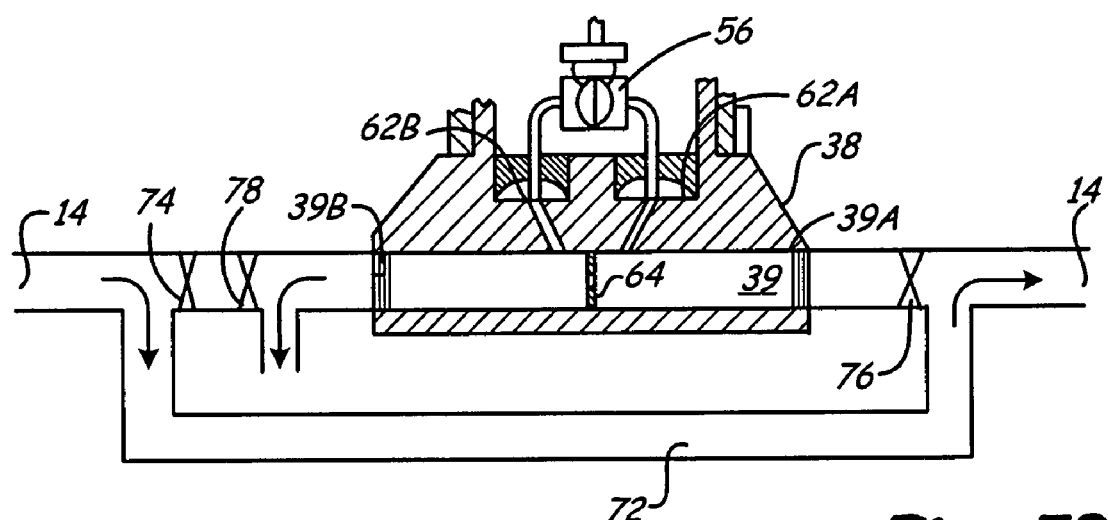
FIG. 5B shows the flangeless pressure transmitter of FIG. 5A with the external valves and piping in a closed configuration.

FIGS. 5A and 5B show an embodiment of the invention in which base 38 of sensor module 26 is configured to include bypass manifold or bypass piping 72, first bypass valve 74, second bypass valve 76 and vent valve 78. Pipe 14 is connected to base 38 through couplings 39A and 39B. As explained above, couplings 39A and 39B can comprise any type of repeatable connector such as threaded couplings, quick disconnects, poppet valve type connectors or any other suitable connector. Bypass piping 72 is spliced into pipe 14 upstream of where the process fluid enters base 38. Piping 72 is spliced into pipe 14 at a valved juncture such that the flow or process fluid can be routed through or around duct 39.

FIG. 5A shows sensor module 26 under normal operating conditions in which valves 74, 76 and 78 are closed to direct process fluid through duct 39 to measure flow with primary element 64. Thus, pressure sensor 56 is able to obtain pressure readings from the interaction of diaphragms 62A and 62B with the process fluid. It is sometimes desirable to perform diagnostic tests or other maintenance on transmitter 12 or sensor 56 such that it is required to cease flow of the process fluid through duct 39. Accordingly, valves 74, 76 and 78 can be adjusted to direct process fluid flow through bypass piping 72 without interrupting the flow of the process fluid through pipe 14.

FIG. 5B shows valves 74, 76 and 78 configured to direct process fluid from pipe 14 to bypass piping 72. In this configuration, the process fluid ceases to exert a pressure on diaphragms 62A and 62B so that pressure sensor 56 does not produce a pressure signal responsive to the process fluid pressure. Vent valve 78 can be opened to allow venting of duct 39 to atmospheric conditions. As such, various testing, maintenance and diagnostics can be performed on transmitter 12, including transmitter circuitry 30 and sensor 56. Valves 74, 76 and 78 can comprise any type of valves suitable for controlling flow of a process fluid in a process control system. Particularly, valves 74 and 76 comprise valves that alternatively direct fluid between duct 39 and piping 72. In various embodiments of the invention, valves 74, 76 and 78 comprise threaded valve pins, directional valves, poppet type valves, T- or L-type ball valves, or standard vent/drain valves as are known in the industry. In yet other embodiments, transmitter 12 is used in conjunction with control valves and a proportional-integral-derivative (PID) controller for automating process fluid flow through pipe 14 to transmitter 12.

Although the present invention has been described with reference to preferred embodiments, workers skilled in the art will recognize that changes may be made in form and detail without departing from the spirit and scope of the invention.

The invention claimed is:

1. A pressure transmitter for use in industrial process control systems, the pressure transmitter comprising:
 a sensor module comprising:
  a differential pressure sensor for sensing a pressure differential in a process fluid;
  a base having a process fluid flow duct extending from a first side of the base through to a second side of the base for receiving the process fluid;
  a primary element positioned in the process fluid flow duct between the first side and the second side;
  first and second isolation diaphragm recesses positioned on a third side of the base facing away from the fluid flow duct:
  first and second impulse piping lines extending from the fluid flow duct on either side of the primary element, through the base, and to the first and second isolation diaphragm recesses, respectively;
  first and second fill fluid passageways extending from the first and second isolation diaphragm recesses, respectively, to the differential pressure sensor; and
  first and second isolation diaphragms positioned within the first and second isolation diaphragm recesses, respectively, to seal the first and second isolation diaphragm recesses from the first and second impulse piping lines, respectively; and
 a transmitter housing connected to the sensor module, the transmitter housing containing transmitter circuitry for processing output of the pressure sensor.

2. The pressure transmitter of claim 1 wherein the primary element permits fluid flow through the process fluid flow duct from the first side to the second side and causes the pressure differential in the process fluid.

3. The pressure transmitter of claim 1 wherein the primary element is selected from the group consisting of: a venturi tube, an orifice plate, a pitot tube or a flow nozzle.

4. The pressure transmitter of claim 1 wherein the primary element is shaped from the process fluid flow duct and the first and second impulse piping lines and the first and second isolation diaphragm recesses are shaped from the base such that the primary element, the first and second impulse piping lines and the first and second isolation diaphragm recesses are unitary with the sensor module.

5. The pressure transmitter of claim 1 wherein the process fluid flow duct includes couplings for joining a process fluid source to the sensor module, and the sensor module includes couplings for securing the pressure transmitter to a mounting fixture.

6. The pressure transmitter of claim 1 wherein the sensor module includes a sensor pocket unitary with the base for housing the differential pressure sensor and wherein the first and second isolation diaphragm recesses open to the sensor pocket.

7. The pressure transmitter of claim 1 and further comprising a bypass manifold comprising:
a bypass flow duct connecting a first end of the process fluid flow duct with a second end of the process fluid flow duct external to the base;
a first bypass valve positioned between the bypass flow duct and the first end of the process fluid flow duct; and
a second bypass valve positioned between the bypass flow duct and the second end of the process fluid flow duct.

8. The pressure transmitter of claim 1 wherein the first and second isolation diaphragms are secured to first and second diaphragm base disks positioned within the first and second isolation diaphragm recesses of the sensor module, wherein the first and second base disks include openings for receiving the first and second fill fluid passageways.

9. The pressure transmitter of claim 8 wherein the pair of process diaphragm base disks are co-planar with each other.

10. The pressure transmitter of claim 8 wherein the first and second isolation diaphragms are welded to the first and second base disks, respectively, and the first and second base disks are welded to the first and second isolation diaphragm recess, respectively, thereby uncoupling the first and second process isolation diaphragms from the base and stress associated with the base.

11. The pressure transmitter of claim 1 wherein the sensor module and the transmitter housing comprise an integral unit.

12. The pressure transmitter of claim 1 wherein the primary element closes off the fluid flow duct into two separate compartments such that fluid is not permitted to flow through the fluid flow duct from the first side to the second side.

13. The pressure transmitter of claim 1 wherein the first and second isolation diaphragms are mounted along a non-mating face of the base.

14. The pressure transmitter of claim 13 wherein the first and second isolation diaphragm recesses are free of mating-related stress.

15. The pressure transmitter of claim 13 wherein the first and second isolation diaphragms are positioned internally within the base of the sensor module.

16. A sensor module for use in an industrial process transmitter, the sensor module comprising:
a differential pressure sensor for sensing a pressure differential in a process fluid;
a base having a process fluid flow duct for receiving the process fluid;
a primary element positioned in the process fluid flow duct and for causing the pressure differential in the process fluid;
impulse piping lines extending from the fluid flow duct on either side of the primary element;
fill fluid passageways connecting the impulse piping lines with the differential pressure sensor; and
isolation diaphragms for segregating the impulse piping lines from the fill fluid passageways, wherein the isolation diaphragms are positioned internally within the base and mounted along a non-mating face of the base.

17. The sensor module of claim 16 wherein the process fluid flow duct, the primary element and the impulse piping lines are shaped from the base such that the sensor module has a uni-body construction.

18. The sensor module of claim 16 wherein the process fluid flow duct includes couplings for joining a process fluid source to the sensor module, and the sensor module further includes couplings for securing the pressure transmitter to a mounting fixture.

19. The sensor module of claim 16 wherein the pressure transmitter includes a bypass manifold connecting portions of the process fluid flow duct on either side of the primary element such that fluid is permitted to flow around the primary element.

20. The sensor module of claim 19 wherein the bypass manifold comprises:
a bypass flow duct connecting a first end of the process fluid flow duct with a second end of the process fluid flow duct external to the base;
a first bypass valve positioned between the bypass flow duct and the first end of the process fluid flow duct; and
a second bypass valve positioned between the bypass flow duct and the second end of the process fluid flow duct.

21. The sensor module of claim 16 wherein the isolation diaphragms are secured to a pair of process diaphragm base disks recessed within a surface of the sensor module above the fluid flow duct.

22. An industrial pressure transmitter for use in industrial process control systems, the industrial pressure transmitter comprising:
a differential pressure sensor;
a flangeless process connector connected to the differential pressure sensor through an internal hydraulic system;
a process fluid flow duct extending through the flangeless process connector and for receiving an industrial process fluid;
a primary element positioned in the process fluid flow duct for producing a pressure differential in the process fluid across the primary element; and
wherein the differential pressure sensor is connected to the process fluid flow duct to sense the pressure differential across the primary element.

23. The industrial pressure transmitter of claim 22 wherein the hydraulic system further comprises:
impulse piping lines extending from the fluid flow duct on either side of the primary element within the flangeless process connector;
fill fluid passageways connecting the impulse piping lines with the differential pressure sensor; and
isolation diaphragms for segregating the impulse piping lines from the fill fluid passageways.

24. The industrial pressure transmitter of claim 23 wherein the isolation diaphragms are recessed within a top surface of the integrated process connector so as to be mounted along a non-mating face of the flangeless process connector.

25. The industrial pressure transmitter of claim 22 wherein the primary element is selected from the group consisting of: a venturi tube, an orifice plate, a pitot tube or a flow nozzle.

26. The industrial pressure transmitter of claim 22 wherein the primary element is shaped from the process fluid flow duct such that the primary element is unitary with the flangeless process connector.

27. The industrial pressure transmitter of claim 22 wherein the flangeless process connector includes a bypass manifold.

28. The industrial pressure transmitter of claim 27 wherein the bypass manifold comprises:

a bypass flow duct connecting a first end of the process fluid flow duct with a second end of the process fluid flow duct external to the flangeless process connector;

a first bypass valve positioned between the bypass flow duct and the first end of the process fluid flow duct; and a second bypass valve positioned between the bypass flow duct and the second end of the process fluid flow duct.

29. The industrial pressure transmitter of claim 28 and further comprising a vent valve positioned between the first bypass valve and the first end of the process fluid flow duct.

30. An industrial pressure transmitter for use in industrial process control systems, the industrial pressure transmitter comprising:

a differential pressure sensor;

an integrated process connector connected to the differential pressure sensor;

a process fluid flow duct extending through the integrated process connector and for receiving an industrial process fluid;

a primary element positioned in the process fluid flow duct for producing a pressure differential in the process fluid across the primary element, wherein the differential pressure sensor is connected to the process fluid flow duct to sense the pressure differential across the primary element; and a bypass manifold comprising:

a bypass flow duct connecting a first end of the process fluid flow duct with a second end of the process fluid flow duct external to the integrated process connector;

a first bypass valve positioned between the bypass flow duct and the first end of the process fluid flow duct; and a second bypass valve positioned between the bypass flow duct and the second end of the process fluid flow duct.

* * * * *